United States Patent
Yao et al.

(10) Patent No.: US 7,893,137 B2
(45) Date of Patent: Feb. 22, 2011

(54) RESIN COMPOSITION AND MOLDED ARTICLE

(75) Inventors: Kenji Yao, Kanagawa (JP); Masahiro Moriyama, Kanagawa (JP); Toshiaki Sagara, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/511,480

(22) Filed: Jul. 29, 2009

(65) Prior Publication Data

US 2010/0190002 A1 Jul. 29, 2010

(30) Foreign Application Priority Data

Jan. 28, 2009 (JP) .............................. 2009-016491

(51) Int. Cl.
*C08J 5/20* (2006.01)
*C08K 11/00* (2006.01)
*C08L 89/00* (2006.01)
*C08L 97/02* (2006.01)

(52) U.S. Cl. .......................................... 524/9; 524/284
(58) Field of Classification Search ...................... 524/9
See application file for complete search history.

(56) References Cited

U.S. PATENT DOCUMENTS

| 5,130,383 | A | * | 7/1992 | Yoshino et al. | ............. | 525/423 |
| 2009/0054559 | A1 | * | 2/2009 | Serizawa et al. | ............... | 524/9 |
| 2009/0069463 | A1 | * | 3/2009 | Serizawa et al. | ............... | 524/9 |

FOREIGN PATENT DOCUMENTS

| JP | A-2005-320409 | 11/2005 |
| JP | A-2008-106086 | 5/2008 |

* cited by examiner

*Primary Examiner*—James Seidleck
*Assistant Examiner*—Deve Valdez
(74) *Attorney, Agent, or Firm*—Oliff & Berridge, PLC

(57) ABSTRACT

A resin composition includes (A) a polylactic acid and (B) polyarylate particles having a number average particle diameter of from 10 nm to 300 μm.

13 Claims, 1 Drawing Sheet

US 7,893,137 B2

RESIN COMPOSITION AND MOLDED ARTICLE

CROSS-REFERENCE TO RELATED APPLICATION

This application is based on and claims priority under 35 USC 119 from Japanese Patent Application No. 2009-016491 filed on Jan. 28, 2009.

BACKGROUND

1. Technical Field

The present invention relates to a resin composition and a molded article.

2. Related Art

Conventionally, polymeric materials, such as polystyrene, polystyrene-ABS resin copolymers, polycarbonate, polyester, polyphenylene sulfide, and polyacetal, have been used in components of electrical devices and electronic and electrical devices, owing to their excellent thermal resistance and mechanical strength, and, in the case of components of the electronic devices in particular, excellent maintainability of mechanical strength against environmental changes.

In recent years, use of polylactic acid resin materials, instead of the polymeric materials described above, has been studied from the viewpoint of environmental problems. The polylactic acid resin materials are derived from plants, can decrease the amount of $CO_2$ emission, reduce the consumption of petroleum, which is at a risk of exhaustion, and reduce the burden on the environment.

SUMMARY

According to an aspect of the present invention, there is provided a resin composition including (A) a polylactic acid and (B) polyarylate particles having a number average particle diameter of from 10 nm to 300 μm.

BRIEF DESCRIPTION OF THE DRAWING

Exemplary embodiments of the present invention will be described in detail based on the following FIGURE, wherein.

DETAILED DESCRIPTION

Figure 1:
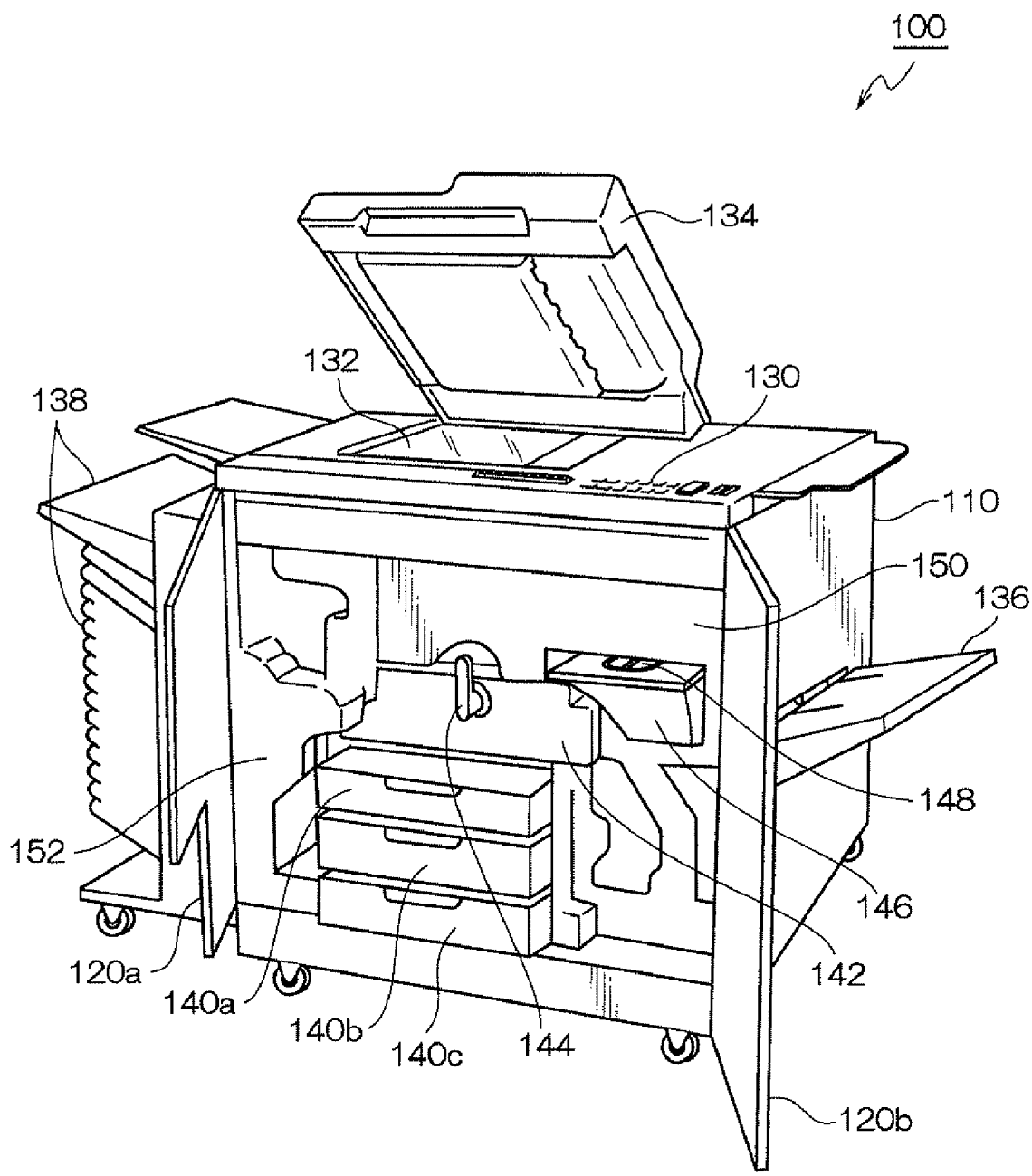
FIG. 1 is a diagram schematically showing an example of an electronic and electrical apparatus having a molded article of an embodiment of the present invention.

An exemplary embodiment of the resin composition and molded article of the present invention is described below.

Resin Composition

The resin composition of the present exemplary embodiment includes (A) polylactic acid and (B) polyarylate particles having a number average particle diameter of from 10 nm to 300 μm.

While polylactic acid (hereinafter also referred to as "(A) component") is known as a material that is derived from plants that can decrease the amount of $CO_2$ emission, reduce the consumption of petroleum—a resource at a risk of exhaustion—and reduce the burden on the environment, polylactic acid has low thermal resistance, low flame retardancy, and low impact resistance.

Although polyarylate has high thermal resistance, high flame retardancy, and high impact resistance, its melting temperature is high (300° C. or more) and, therefore, it is difficult to mix polyarylate with polylactic acid, which is thermally decomposed at 250° C.

An attempt has been made to form polyarylate into fibers and mix them into polylactic acid. However, since the adhesiveness between polylactic acid and the fibers at interfaces thereof is poor, the thermal resistance, flame retardancy, and impact resistance of the resulting mixture is the same as the case in which polylactic acid is used singly.

The resin composition of the present exemplary embodiment is obtained by pulverizing polyarylate to adjust its number average particle diameter to be from 10 nm to 300 μm and then dispersing the pulverized polyarylate in polylactic acid; as a result, high thermal resistance, high flame retardancy, and high impact resistance, which is at a level which could not be expected from the case of using the above fibrous polyarylate, are realized.

Although the reasons for the improvement in thermal resistance, flame retardancy, and impact resistance up to the unexpected level achieved by adopting the above configuration of the resin composition of the present exemplary embodiment are unclear, they are presumed to be as follows. Nevertheless, the following reasoning should not be construed as limiting the present exemplary embodiment.

One reason may be that polyarylate itself has very high thermal resistance, very high flame retardancy, and very high impact strength. However, the adhesiveness of the fibrous polyarylate to the polylactic acid at interfaces thereof is weak, and, therefore, it is difficult to disperse the fibrous polyarylate in the polylactic acid.

Improved effects are obtained by using the pulverized polyarylate particles having an average particle diameter of from 10 nm to 300 μm, compared with the case in which the fibrous polyarylate is used. It is presumed that the reason therefor is an increase in surface area of the polyarylate particles achieved by the pulverization, rather than by the fibrillation, and, a resultant increase in adhesiveness thereof to the polylactic acid. It is also presumed that, while the fibrous polyarylate has dense molecular chains and does not melt readily at low temperatures, the pulverized polyarylate has a larger average distance between molecular chains and melts relatively readily, whereby dispersion of the pulverized polyarylate into polylactic acid, which have conventionally been difficult to achieve, is enhanced.

It is further presumed that, in the resin composition of the present exemplary embodiment, a polar group, $C=O$, participating in an arylate bond contained in the polyarylate particles interacts with a terminal OH group of the polylactic acid (and of an optional flame retardant or optional added particle), so that the bonding of the polyarylate particles to the polylactic acid which serves as a matrix, is strengthened and, as a result, the polyarylate particles are uniformly dispersed into the polylactic acid.

The respective components contained in the resin composition of the present exemplary embodiment are described below.

(A) Polylactic Acid

The resin composition of the present exemplary embodiment includes (A) polylactic acid. The polylactic acid of the present exemplary embodiment is derived from plants and is effective in reducing the burden on the environment, more specifically, in reducing $CO_2$ emissions and petroleum consumption.

The polylactic acid of the present exemplary embodiment is not particularly limited, and may be any condensate of lactic acid. The polylactic acid may be a polymer formed from molecules of L-lactic acid, a polymer formed from molecules of D-lactic acid, or a copolymer of L-lactic acid and D-lactic acid, or a mixture of two or more of the above polymers.

The molecular weight of the polylactic acid of the present exemplary embodiment is not particularly limited, and the weight average molecular weight of the polylactic acid is preferably from 8,000 to 200,000 (or from about 8,000 to about 200,000), and more preferably from 15,000 to 120,000 (or from about 15,000 to about 120,000). When the weight average molecular weight of the polylactic acid is 8,000 or more, mechanical strength at low temperatures tends to increase. When the weight average molecular weight is 200,000 or less, flexibility tends to increase.

In the present exemplary embodiment, the polylactic acid may be prepared by synthesis or may be a commercially available product. Examples of the commercially available product include TERRAMAC TE4000 (trade name, manufactured by Unitika Ltd.) and LACEA H100 (trade name, manufactured by Mitsui Chemicals, Inc.).

In the present exemplary embodiment, one kind of polylactic acid may be used singly, or two or more kinds of polylactic acid may be used in combination.

The content (total content if two or more kinds of polylactic acid are used in combination) of polylactic acid in the present exemplary embodiment is not particularly limited. From the viewpoint of the reducing the burden on the environment, the content of polylactic acid is preferably 25% by weight or more (or about 25% by weight or more), more preferably from 30% by weight to 95% by weight (or from about 30% by weight to about 95% by weight), and still more preferably from 30% by weight to 90% by weight (or from about 30% by weight to about 90% by weight), with respect to the total amount of the resin composition.

(B) Polyarylate Particles having Number Average Particle Diameter of from 10 nm to 300 µm The resin composition of the present exemplary embodiment includes (B) polyarylate particles (hereinafter also referred to as "(B) component") having a number average particle diameter of from 10 nm to 300 µm.

The (B) component is not particularly limited, and the (B) component is preferably pulverized polyarylate particles having a number average particle diameter of from 10 nm to 300 µm.

The number average particle diameter of the polyarylate particles is from 10 nm to 300 µm, and preferably from 50 nm to 100 µm (or from about 50 nm to about 100 µm). A number average particle diameter of 10 nm or more is sufficient size as a filler, and sufficient effects in improving impact strength and thermal resistance may be obtained. When the number average particle diameter is 300 µm or less, insufficient dispersing may be prevented, and sufficient impact strength and thermal resistance may be obtained.

The term, "number average particle diameter", as used herein refers to a value obtained by measurement with a MICROTRAC PARTICLE SIZE DISTRIBUTION MEASURING DEVICE MT3000II (trade name, manufactured by Nikkiso Co., Ltd.)

The structure of the polyarylate serving as the (B) component is not particularly limited, and a polyarylate formed from a combination of a bisphenol and an aromatic dicarboxylic acid is preferable.

Examples of the structure include a structure formed from bisphenol A and terephthalic acid, a structure formed from bisphenol A and naphthalenedicarboxylic acid, a structure formed from bisphenol A and biphenyldicarboxylic acid, a structure formed from bisphenol S and terephthalic acid, and a structure formed from bisphenol C and terephthalic acid.

One kind selected from these structures may be used singly, or two or more kinds selected from these structures may be used in combination.

The molecular weight of the polyarylate serving as the (B) component is not particularly limited, and the polystyrene-equivalent weight average molecular weight thereof is preferably from 5,000 to 100,000 (or from about 5,000 to about 100,000), and particularly preferably from 10,000 to 70,000 (or from about 10,000 to about 70,000). When the molecular weight is 5,000 or more, strength may be sufficient, and effects in improving impact resistance and thermal resistance may be sufficient. When the molecular weight is 100,000 or less, the pulverization process may be performed without difficulty.

The polyarylate serving as the (B) component may be prepared by, for example, pulverizing a polyarylate in the form of a pellet, a polyarylate in the form of a lump obtained by re-precipitation, or a fibrous polyarylate using a known pulverization method, such as by using a grinding mill, ball mill or the like, and sieving the pulverized polyarylate with a mesh or the like so as to make uniform the particle diameters. The polyarylate in the form of a pellet, the polyarylate in the form of a lump, and the fibrous polyarylate may be prepared by synthesis or may be a commercially available product. Examples of the commercially available product include U-POLYMER U100, P1001, U-8000, AX-1500 (trade names, manufactured by Unitika Ltd.).

In the present exemplary embodiment, one kind of (B) component may be used singly, or two or more kinds of (B) component may be used in combination.

The content (total content in the case where two or more kinds of (B) component are used in combination) of (B) component in the present exemplary embodiment is not particularly limited, and, from the viewpoint of enhancement of impact strength and flame retardancy, is preferably from 1% by weight to 15% by weight (or from about 1% by weight to about 15% by weight), more preferably from 3% by weight to 12% by weight (or from about 3% by weight to about 12% by weight), and still more preferably from 3% by weight to 10% by weight (or from about 3% by weight to about 10% by weight), with respect to the total amount of the resin composition.

Regarding a combination of the content of the (A) component and the content of the (B) component in the present exemplary embodiment, a combination is preferable in which the content of the (A) component is 25% by weight or more (more preferably, from 30% by weight to 95% by weight) with respect to the total amount of the resin composition and the content of the (B) component is from 1% by weight to 15% by weight (more preferably, from 3% by weight to 12% by weight) with respect to the total amount of the resin composition, from the viewpoint of impact strength, thermal resistance, and flame retardancy.

(C) At Least One Selected from the Group Consisting of Clay, Talc, Mica, and Natural Fiber The resin composition of the present exemplary embodiment may further include (C) at least one selected from the group consisting of clay, talc, mica, and a natural fiber (hereinafter also referred to as "C component").

The (C) component may further include at least one of a melamine-containing particle, a phosphate particle, or titanium oxide.

In the "group consisting of clay, talc, mica, and a natural fiber", each substance is in the form of a particle or a fiber The number average particle diameter of the particles is preferably from 0.01 µm to 5 µm (or from about 0.01 µm to about 5 µm), and more preferably from 0.05 µm to 2 µm (from about 0.05 µm to about 2 µm). When the number average particle diameter is 0.01 µm or more, sufficient effects as a filler may be generated, which may result in sufficiently improved thermal resistance. When the number average particle diameter is 5 µm or less, satisfactory dispersibility may be obtained, which may result in sufficiently improved thermal resistance.

The average diameter of the above fibers is preferably from 0.5 µm to 25 µm (or from about 0.5 µm to about 25 µm). The average length of the fiber is preferably from 2 mm to 8 mm.

The (C) component may be prepared by synthesis or may be a commercially available product.

Examples of commercially available clay products include NANOCLAY MX (trade name, manufactured by Nanocor Inc.).

Examples of commercially available talc products include MICRO ACE P8 (trade name, manufactured by Nippon Talc Co., Ltd.).

Examples of commercially available mica products include MICA POWDER (trade name, manufactured by Japan Mica Industrial Co., Ltd.) and SJ-005 and SYA21-RS (trade names, manufactured by Yamaguchi Mica Co., Ltd.).

Examples of natural fibers include natural jute.

Examples of commercially available natural fiber products include Kenaf fiber, bamboo fiber, and cellulose whisker.

The content of (C) component in the present exemplary embodiment is not particularly limited, and, from the viewpoint of thermal resistance and flame retardancy, is preferably from 1% by weight to 50% by weight (or from about 1% by weight to about 50% by weight), and more preferably from 3% by weight to 20% by weight (or from about 3% by weight to about 20% by weight), with respect to the total amount of the resin composition.

(D) At Least One Selected from the Group Consisting of Phosphorus-Based Flame Retardant, Silicone-Based Flame Retardant, Nitrogen-Based Flame Retardant, and Inorganic-Hydroxide-Based Flame Retardant The resin composition of the present exemplary embodiment may further contain (D) at least one selected from the group consisting of the phosphorus-based flame retardant, silicone-based flame retardant, nitrogen-based flame retardant, and inorganic hydroxide-based flame retardant (hereinafter also referred to as "D component").

The (D) component may be prepared by synthesis or may be a commercially available product.

Examples of commercially available phosphorus-based flame retardant products include PX-200 and PX-202 (trade names, manufactured by Daihachi Chemical Industry Co., Ltd.), TERRAJU C80 (trade name, manufactured by Chemische Fabrik Budenheim KG), and EXOLIT AP422 and EXOLIT OP930 (trade names, manufactured by Clariant AG).

Examples of commercially available silicone-based flame retardant products include DC4-7081 (trade name, manufactured by Dow Corning Toray Co., Ltd.).

Examples of commercially available nitrogen-based flame retardant products include APINON 901 (trade name, manufactured by Sanwa Chemical Co., Ltd.), melamine pyrophosphate manufactured by Shimonoseki Mitsui Chemicals, Inc., and FP2100 (trade name, manufactured by ADEKA CORPORATION).

Examples of commercially available inorganic-hydroxide-based flame retardant products include MGZ300 (trade name, manufactured by Sakai Chemical Industry Co., Ltd.) and B103ST (trade name, manufactured by Nippon Light Metal Co., Ltd.).

The content of (D) component of the present exemplary embodiment is not particularly limited. From the viewpoint of flame retardancy and impact resistance, the content of (D) component is preferably from 2% by weight to 20% by weight (or from about 2% by weight to about 20% by weight), and more preferably from 5% by weight to 15% by weight (or from about 5% by weight to about 15% by weight), with respect to the total amount of the resin composition.

Regarding a combination of the content of (A) component, the content of (B) component and the content of (D) component in the present exemplary embodiment, the following combination T is preferable from the viewpoint of impact strength, thermal resistance, and flame retardancy:

Combination T: the content of (A) component is 25% by weight or more (more preferably, from 30% by weight to 90% by weight) with respect to the total amount of the resin composition, the content of (B) component is from 1% by weight to 15% by weight (more preferably, from 3% by weight to 10% by weight) with respect to the total amount of the resin composition, and the content of (D) component is from 2% by weight to 20% by weight (more preferably, from 5% by weight to 15% by weight) with respect to the total amount of the resin composition.

Other Components

The resin composition of the present exemplary embodiment may contain components other than the (A) component, the (B) component, the (C) component, and the (D) component. Examples of other components include a releasing agent, a weather-resistant agent, a light-resistant agent, and a colorant.

The resin composition of the present exemplary embodiment described above may be prepared by kneading at least the (A) component and the (B) component (and, optionally, other components such as at least one of the (C) component or the (D) component) using a known method.

The kneading is performed using a known kneading device, such as a biaxial kneader (for example, TEM58SS (trade name) manufactured by Toshiba machine Co., Ltd.) or a simple kneader (for example, LABO PLASTOMILL (trade name) manufactured by Toyo Seiki Seisaku-sho, Ltd.).

During the kneading, the cylinder temperature is preferably from 160° C. to 240° C., and more preferably from 170° C. to 210° C., from the viewpoint of suppression of the decomposition of the polylactic acid or the like.

Molded Article

A molded article of the present exemplary embodiment can be obtained by molding the resin composition of the present exemplary embodiment described above. For example, a resin molded article of the present exemplary embodiment may be obtained by molding the resin composition using a molding method such as injection molding, extrusion molding, blow molding, or heat-press molding. The resin molded article of the present exemplary embodiment is preferably obtained by injection-molding of the resin composition of the present exemplary embodiment, in consideration of dispersibility of the polyarylate in the molded article.

The injection molding may be performed using, for example, a commercially available apparatus such as NEX150 (trade nema, manufactured by Nissei Plastic Industrial Co., Ltd.), NEX70000 (trade name, manufactured by Nissei Plastic Industrial Co., Ltd.), or SE50D (trade name, manufactured by Toshiba Machine Co., Ltd.).

During the injection molding, the cylinder temperature is preferably from 160° C. to 240° C., and more preferably from 170° C. to 210° C., from the viewpoint of suppression of the decomposition of the polylactic acid or the like. The temperature of the mold is preferably from 30° C. to 120° C., and more preferably from 30° C. to 60° C., from the viewpoint of productivity.

Further, the degree of crystallinity of the (A) polylactic acid in the molded article of the present exemplary embodiment is preferably 20% or more (or about 20% or more). When the degree of crystallinity is 20% or more, sufficient thermal resistance may be obtained.

Here, the term "degree of crystallinity" as used herein refers to a value obtained by a measurement according to the density gradient tube method. More specifically, a standard specimen having a degree of crystallinity of 100% and a standard specimen having a degree of crystallinity of 0% are floated in a density gradient pipe formed by a mixed system of two kinds of alcohol. The density of these two kinds of standard specimen can be determined from the floating positions of the standard specimens, and a calibration curve of density versus degree of crystallinity is drawn. Then, a test piece (having the same volume as the standard specimen) of a sample whose degree of crystallinity is to be measured is floated in the density gradient tube to determine the density thereof based on the floating position, and the degree of crystallinity thereof is obtained based on the calibration curve and is used as the "degree of crystallinity".

Components of Electronic and Electrical Devices

The molded article of the present exemplary embodiment may have excellent mechanical strength (impact strength and flexibility), excellent thermal resistance, and excellent flame retardancy. Therefore, the molded article of the present exemplary embodiment can be suitably used in applications such as electronic and electrical devices, household electrical appliances, containers, and automotive interior. More specifically, applications of the molded article include casings and various components of household electrical appliances and electronic and electrical devices, wrapping films, housing cases for CD-ROMs or DVDs, eating utensils, food trays, beverage bottles, and medicine wrapping materials. The molded article of the present exemplary embodiment is particularly preferably used in components of electronic and electrical devices. Many of the components of electronic and electrical devices have complicated shapes and are heavy, so that the components are required to possess very high impact strength and plane shock resistance. The resin molded article of the present exemplary embodiment may sufficiently satisfy these requirements.

FIG. 1 is a perspective view of the external appearance, as seen from the front, of an image forming apparatus, which is an example of components of electronic and electrical devices having a molded article of the present exemplary embodiment.

An image forming device 100 shown in FIG. 1 is equipped with front covers 120a and 120b at the front of a main body device 110 of the apparatus. These front covers 120a and 120b are configured to be freely opened and closed so that an operator can access the interior of the apparatus. Thus, the operator can refill toner when toner exhaustion occurs, can replace an exhausted process cartridge, and can remove a jammed sheet when jamming occurs in the apparatus. FIG. 1 shows the apparatus in a state in which the front covers 120a and 120b are open.

On an upper surface of the main body device 110, an operation panel 130, with which various conditions related to image formation (such as paper size or the number of sheets) are inputted by the operator, and a copy glass 132, on which a document to be read is placed, are provided. The main body device 110 includes, at an upper portion thereof, an automatic sheet feeder 134 that conveys a document onto the copy glass 132. Moreover, the main body device 110 is equipped with an image scanner that scans the image of the document placed on the copy glass 132 and obtains image data representing the document image. The image data obtained by the image scanner is transmitted through a controller to an image formation unit. The image scanner and the controller are accommodated in a housing 150, which is a part of the main body device 110. The image formation unit is accommodated in the housing 150 as a process cartridge 142 that is freely attachable and detachable. The process cartridge 142 is attached and detached by rotating an operation lever 144.

A toner accommodation section 146 is attached to the housing 150 of the main body device 110, and toner is supplied from a toner supply port 148 to the toner accommodation section 146. The toner accommodated in the toner accommodation portion 146 is supplied to a development device.

The main body device 110 include, at a lower portion thereof, paper accommodation cassettes 140a, 140b, and 140c. In the main body device 110, plural pairs of conveyance rollers are provided, and a conveyance path is formed along which a sheet in the paper accommodation cassette is conveyed to the image formation unit disposed above. Sheets housed in the paper accommodation cassette is taken out one by one by a paper take-out mechanism disposed near an end of the conveying path, and are fed into the conveying path. A manual paper feed section 136 is further provided at a side of the main body device 110, and sheets can be fed also from the manual paper feed section 136.

Sheets on which images have been formed by the image formation unit are sequentially conveyed through between two fixing rolls that contact with each other and that are supported by a housing 152, which is a part of the main body device 110. Then, the sheets are discharged to outside the main body device 110. The main body device 110 is equipped with plural paper discharge sections 138 that are disposed at a side opposite to the side at which the manual paper feed section 136 is attached, and sheets that have been subjected to image formation are discharged to the paper discharge sections.

In the image forming device 100, members for office machines, such as the front covers 120a and 120b, the exterior part of the process cartridge 142, the housings 150 and 152, preferably have properties including thermal resistance, impact resistance, and flame retardancy.

Therefore, the molded article formed using the resin composition of the present exemplary embodiment can be suitably used as such components of electronic and electrical devices.

EXAMPLES

The present invention is described more specifically by referring to examples below. However, the present invention is not limited to these examples.

Production of Polyarylate Particles

Polyarylate pellets (U-POLYMER U100 (trade name) manufactured by Unitika Ltd.) are dry-milled by using a milling machine (TURBO DISK MILL manufactured by Turbo Kogyo Co., Ltd.), and are classified into groups having different number average particle diameters (a: 8 nm, b: 15 nm, c: 30 μm, d: 280 μm, e: 350 μm) by using meshes having apertures of 10 nm, 30 nm, 50 μm, 300 μm, 400 μm, respectively (custom-made products manufactured by Semitec Co., Ltd.).

The measurement of number average particle diameter is performed using a MICROTRAC PARTICLE SIZE DISTRIBUTION MEASURING DEVICE MT3000II manufactured by Nikkiso Co., Ltd.

Example 1 to Example 17

Production of Resin Composition

The materials shown in Table 1 in the composition ratio shown in Table 1 are kneaded using a biaxial kneader (TEM58SS (trade name) manufactured by Toshiba machine Co., Ltd.) under the condition of a cylinder temperature of 230° C., whereby resin compositions having the compositions shown in Table 1 are obtained.

Production, Measurement, and Evaluation of Molded Article

Using the resin compositions obtained above, molded articles are produced, measured, and evaluated as follows. The results of the measurement and evaluation are shown in Table 2.

Measurement of Degree of Crystallinity of Polylactic Acid

A test piece (10 mm×10 mm×2 mm in size) for measuring the degree of crystallinity, which has the same volume as the below-mentioned standard specimen, is obtained by injection-molding the resin composition prepared above using an injection molder (NEX150 (trade name) manufactured by Nissei Plastic Industrial Co., Ltd.) under the condition of the cylinder temperature and mold temperature shown in Table 2. Then, standard specimens having crystallinity degrees of 100% and 0%, respectively, are floated in a density gradient tube formed by a mixture system of two kinds of alcohol (the mixture system is selected from those having a mixing ratio of methanol/butanol of 1/9, 2/8, 3/7, 4/6, 5/5, 6/4, 7/3, 8/2, and 9/1). The densities of the standard specimens having crystallinity degrees of 100% and 0%, respectively, are determined from the floating positions of the standard specimens, and a calibration curve of density versus degree of crystallinity is drawn.

Then, the test piece for measuring the degree of crystallinity is floated in the density gradient tube, and the density of the test piece was determined from the floating position thereof, and the degree of crystallinity is obtained from the calibration curve.

Charpy Impact Strength Measurement

An ISO multipurpose dumbbell specimen (compatible with ISO 527 Tensil Test and ISO 178 Bending Test, the test portion is 4 mm in thickness and 10 mm in width) is obtained by injection-molding the resin composition prepared above using an injection molder (NEX150 (trade name) manufactured by Nissei Plastic Industrial Co., Ltd.) under the condition of the cylinder temperature and mold temperature shown in Table 2.

The obtained ISO multipurpose dumbbell specimen is processed, and the Charpy impact strength thereof is measured using an impact resistance test apparatus (DG-5 (trade name) manufactured by Toyo Seiki Seisaku-sho, Ltd.) in accordance with the ISO 179.

A larger Charpy impact strength value is indicative of higher impact resistance.

Measurement of Thermal Deformation Temperature

The ISO multipurpose dumbbell specimen obtained above is used to measure thermal deformation temperatures at a load of 0.45 MPa and 1.80 MPa, respectively, in accordance with the ISO 75.

A higher thermal deformation temperature is indicative of higher thermal resistance.

UL-V Test

Test pieces (having thicknesses of 0.8 mm and 1.6 mm, respectively) for the V test according to the UL-94 are prepared by injection-molding the resin composition prepared above using an injection molder (NEX150 (trade name) manufactured by Nissei Plastic Industrial Co., Ltd.) under the condition of the cylinder temperature and mold temperature shown in Table 2.

The UL-V test is conducted according to the method of the UL-94, using the obtained test pieces for the V test. In the UL-V test results, "V-1" represents the highest flame retardancy and "V-2" represents the second highest flame retardancy next to "V-1". "V-not" represents a flame retardancy that is lower than "V-2".

Steel Ball Drop Test

The resin composition obtained above is dried at 80° C. for 8 hours, and a 10 cm×10 cm flat plate having a thickness of 2 mm is prepared by injection-molding the dried resin composition using an injection molder (NEX70000 (trade name)) manufactured by Nissei Plastic Industrial Co., Ltd.) under the condition of the cylinder temperature and mold temperature shown in Table 2. A steel ball having a diameter of 50 mm and a weight of 500 g is dropped from a height of 1300 mm onto the flat plate so that the steel ball collides with the flat plate, and occurrence of cracks is observed.

Comparative Example 1 to Comparative Example 4

Production of Resin Composition

The materials shown in Table 1 in the composition ratio shown in Table 1 are kneaded using a biaxial kneader (TEM58SS (trade name) manufactured by Toshiba machine Co., Ltd.) under the condition of a cylinder temperature of 230° C., whereby resin compositions having the compositions shown in Table 1 are obtained.

Using the obtained resin compositions, molded articles are in a manner similar to that in Examples, and measurement and evaluation are conducted in the same manner as in Examples. However, in Comparative Example 2, the polyarylate resin does not melt and, therefore, sufficient kneading is impossible. Table 2 shows the results of the measurement and evaluation.

TABLE 1

| | | Polyarylate Particle | | | | | | | | |
|---|---|---|---|---|---|---|---|---|---|---|
| | | a | b | c | d | e | | | | |
| | Polylactic | P.D. = | P.D. = | P.D. = | P.D. = | P.D. = | Particle, Fiber | | | |
| | Acid | 8 nm | 15 nm | 30 μm | 280 μm | 350 μm | Clay | Talc | Mica | Jute |
| Example 1 | 99 | — | — | 1 | — | — | — | — | — | — |
| Example 2 | 85 | — | — | 15 | — | — | — | — | — | — |
| Example 3 | 90 | — | — | 10 | — | — | — | — | — | — |
| Example 4 | 90 | — | 10 | — | — | — | — | — | — | — |
| Example 5 | 90 | — | — | — | 10 | — | — | — | — | — |
| Example 6 | 85 | — | — | 10 | — | — | 5 | — | — | — |
| Example 7 | 85 | — | — | 10 | — | — | — | 5 | — | — |

TABLE 1-continued

| | C1 | C2 | C3 | C4 | C5 | C6 | C7 | C8 | C9 | C10 |
|---|---|---|---|---|---|---|---|---|---|---|
| Example 8 | 85 | — | — | 10 | — | — | — | — | 5 | — |
| Example 9 | 80 | — | — | 10 | — | — | — | — | — | 10 |
| Example 10 | 80 | — | — | 10 | — | — | — | — | — | — |
| Example 11 | 80 | — | — | 10 | — | — | — | — | — | — |
| Example 12 | 80 | — | — | 10 | — | — | — | — | — | — |
| Example 13 | 50 | — | — | 10 | — | — | — | — | — | — |
| Example 14 | 72 | — | — | 15 | — | — | 5 | — | — | — |
| Example 15 | 78 | — | — | 15 | — | — | 5 | — | — | — |
| Example 16 | 78 | — | — | 15 | — | — | 5 | — | — | — |
| Example 17 | 30 | — | — | 15 | — | — | 5 | — | — | — |
| Comp. Ex. 1 | 50 | — | — | — | — | — | — | — | — | — |
| Comp. Ex. 2 | 90 | — | — | — | — | — | — | — | — | — |
| Comp. Ex. 3 | 90 | 10 | — | — | — | — | — | — | — | — |
| Comp. Ex. 4 | 90 | — | — | — | — | 10 | — | — | — | — |

| | Flame retardant | | | | Polybutylene terephthalate resin | Polyarylate Resin (Not pulverized) |
|---|---|---|---|---|---|---|
| | Phosphorus-based | Silicone-based | Nitrogen-based | Inorganic-hydroxide-based | | |
| Example 1 | — | — | — | — | — | — |
| Example 2 | — | — | — | — | — | — |
| Example 3 | — | — | — | — | — | — |
| Example 4 | — | — | — | — | — | — |
| Example 5 | — | — | — | — | — | — |
| Example 6 | — | — | — | — | — | — |
| Example 7 | — | — | — | — | — | — |
| Example 8 | — | — | — | — | — | — |
| Example 9 | — | — | — | — | — | — |
| Example 10 | 10 | — | — | — | — | — |
| Example 11 | — | 10 | — | — | — | — |
| Example 12 | — | — | 10 | — | — | — |
| Example 13 | — | — | — | 40 | — | — |
| Example 14 | 8 | — | — | — | — | — |
| Example 15 | — | 2 | — | — | — | — |
| Example 16 | — | — | 8 | — | — | — |
| Example 17 | — | — | — | 50 | — | — |
| Comp. Ex. 1 | — | — | — | — | 50 | — |
| Comp. Ex. 2 | — | — | — | — | — | 10 |
| Comp. Ex. 3 | — | — | — | — | — | — |
| Comp. Ex. 4 | — | — | — | — | — | — |

Numbers in cells represent weight %.
"P.D." represents "particle diameter".
"Comp. Ex." represents "Comparative Example".

Notes on Table 1

Details of the components shown in Table 1 are as described below.

Polylactic acid: TERRAMAC TE4000 (trade name, manufactured by Unitika Ltd.).

Clay: NANOCLAY MX (trade name, manufactured by Nanocor Inc.).

Talc: MICRO ACE P8 (trade name, manufactured by Nippon Talc Co., Ltd.).

Mica: MICA POWDER (trade name, manufactured by Japan Mica Industrial Co., Ltd.).

Jute: Natural jute (20 μmφ/6 mm)

Phosphorus-based flame retardant: PX-200 (trade name, manufactured by Daihachi Chemical Industry Co., Ltd.).

Silicone-based flame retardant: DC4-7081 (trade name, manufactured by Dow Corning Toray Co., Ltd.).

Nitrogen-based flame retardant: APINON 901 (trade name, manufactured by Sanwa Chemical Co., Ltd.).

Inorganic-hydroxide-based flame retardant: MGZ300 (trade name, manufactured by Sakai Chemical Industry Co., Ltd.).

Polybutylene terephthalate resin: NOVADURAN 5010R3 (trade name, manufactured by Mitsubishi Engineering-Plastics Corporation).

Polyarylate resin: U-POLYMER U100 (trade name, manufactured by Unitika Ltd.) (in Comparative Example 2, the polyarylate resin is not pulverized but used in the form of a cylindrical pellet having a length of 4 mm and a diameter of 3 mm).

TABLE 2

| | Molding temperature (° C.) | | Degree of crystallinity of polylactic acid (%) | Charpy impact strength (KJ/m$^2$) | Thermal deformation temperature (° C.) | | UL-V test | | Results of steel drop test 500 g/50 mm |
|---|---|---|---|---|---|---|---|---|---|
| | Cylinder | Mold | | | 0.45 MPa | 1.80 MPa | 0.8 mm | 1.6 mm | H = 1300 mm |
| Example 1 | 220 | 40 | 8 | 6 | 111 | 74 | V-2 | V-2 | No crack |
| Example 2 | 220 | 40 | 7 | 12.5 | 128 | 90 | V-2 | V-2 | No crack |
| Example 3 | 220 | 40 | 8 | 10 | 125 | 88 | V-2 | V-2 | No crack |

TABLE 2-continued

|  | Molding temperature (° C.) | | Degree of crystallinity of polylactic acid (%) | Charpy impact strength (KJ/m²) | Thermal deformation temperature (° C.) | | UL-V test | | Results of steel drop test 500 g/50 mm |
|---|---|---|---|---|---|---|---|---|---|
|  | Cylinder | Mold |  |  | 0.45 MPa | 1.80 MPa | 0.8 mm | 1.6 mm | H = 1300 mm |
| Example 4 | 220 | 40 | 8 | 8.5 | 124 | 86 | V-2 | V-2 | No crack |
| Example 5 | 220 | 40 | 7 | 9.6 | 126 | 88 | V-2 | V-2 | No crack |
| Example 6 | 220 | 110 | 25 | 10.1 | 145 | 95 | V-2 | V-2 | No crack |
| Example 7 | 220 | 110 | 25 | 8.6 | 136 | 92 | V-2 | V-2 | No crack |
| Example 8 | 220 | 110 | 22 | 8.3 | 138 | 93 | V-2 | V-2 | No crack |
| Example 9 | 220 | 110 | 28 | 11.5 | 139 | 98 | V-2 | V-2 | No crack |
| Example 10 | 220 | 40 | 8 | 9.5 | 96 | 72 | V-2 | V-1 | No crack |
| Example 11 | 220 | 40 | 7 | 10.2 | 98 | 76 | V-2 | V-1 | No crack |
| Example 12 | 220 | 40 | 6 | 8.8 | 92 | 73 | V-2 | V-1 | No crack |
| Example 13 | 220 | 40 | 8 | 8.5 | 94 | 72 | V-2 | V-1 | No crack |
| Example 14 | 220 | 110 | 20 | 9.5 | 120 | 95 | V-2 | V-1 | No crack |
| Example 15 | 220 | 110 | 25 | 9.8 | 112 | 90 | V-2 | V-1 | No crack |
| Example 16 | 220 | 110 | 28 | 9.3 | 125 | 94 | V-2 | V-1 | No crack |
| Example 17 | 220 | 110 | 20 | 8.2 | 119 | 97 | V-2 | V-1 | No crack |
| Comp. Ex. 1 | 220 | 40 | 5 | 3.5 | 63 | 54 | V-not | V-not | Crack |
| Comp. Ex. 2 |  |  |  |  | Kneading impossible | | | | |
| Comp. Ex. 3 | 220 | 40 | 4 | 3.8 | 64 | 58 | V-not | V-not | Crack |
| Comp. Ex. 4 | 220 | 40 | 5 | 3.4 | 65 | 58 | V-not | V-not | Crack |

"Comp. Ex." represents "Comparative Example".

As shown in Table 2, Examples 1 to 17, in which resin compositions each containing polylactic and polyarylate particles having a number average particle diameter of from 10 nm to 300 μm are used, showed excellent thermal resistance, impact resistance, and flame retardancy.

The foregoing description of exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its applications, thereby enabling others skilled in the art to understand the invention for various embodiments and with the various modifications as are suited to particular use contemplated. It is intended that the scope of the invention be defined by the following claims and their equivalents.

What is claimed is:

1. A resin composition, comprising (A) a polylactic acid and (B) polyarylate particles having a number average particle diameter of from 10 nm to 300 μm wherein the polystyrene-equivalent weight average molecular weight of (B) the polyarylate particles is from about 5,000 to about 100,00.

2. The resin composition according to claim 1, wherein the weight average molecular weight of (A) the polylactic acid is from about 8,000 to about 200,000.

3. The resin composition according to claim 1, further comprising (C) at least one selected from the group consisting of clay, talc, mica, and a natural fiber.

4. The resin composition according to claim 3, wherein (C) the at least one selected from the group consisting of clay, talc, mica, and a natural fiber is added to at least one selected from the group consisting of a melamine-containing particle, a phosphate particle, and a titanium oxide.

5. The resin composition according to claim 3, wherein (C) the at least one selected from the group consisting of clay, talc, mica, and a natural fiber is in the form of particles having a number average particle diameter of from about 0.01 μm to about 5 μm.

6. The resin composition according to claim 3, wherein (C) the at least one selected from the group consisting of clay, talc, mica, and a natural fiber is in the form of fibers having an average diameter of from about 0.5 μm to about 25 μm.

7. The resin composition according to claim 1, further comprising (D) at least one selected from the group consisting of a phosphorus-containing flame retardant, a silicone-containing flame retardant, a nitrogen-containing flame retardant, and an inorganic-hydroxide-containing flame retardant.

8. The resin composition according to claim 1, wherein the content of (A) the polylactic acid is from about 25% by weight to about 95% by weight with respect to the total amount of the resin composition.

9. The resin composition according to claim 1, wherein the content of (B) the polyarylate particles is from about 1% by weight to about 15% by weight with respect to the total amount of the resin composition.

10. The resin composition according to claim 3, wherein the content of (C) the at least one selected from the group consisting of clay, talc, mica, and a natural fiber is from about 1% by weight to about 50% by weight with respect to the total amount of the resin composition.

11. The resin composition according to claim 7, wherein the content of (D) the at least one selected from the group consisting of a phosphorus-containing flame retardant, a silicone-containing flame retardant, a nitrogen-containing flame retardant, and an inorganic-hydrogen-based flame retardant is from about 2% by weight to about 20% by weight with respect to the total amount of the resin composition.

12. A molded article, comprising (A) a polylactic acid and (B) polyarylate particles having a number average particle diameter of from 10 nm to 300 μm wherein the polystyrene-equivalent weight average molecular weight of (B) the polyarylate particles is from about 5,000 to about 100,00.

13. The molded article according to claim 12, wherein the degree of crystallinity of (A) the polylactic acid is about 20% or more.

* * * * *